(12) United States Patent
Kim et al.

(10) Patent No.: US 10,172,123 B2
(45) Date of Patent: Jan. 1, 2019

(54) COMMUNICATION METHOD BASED ON DEVICE'S PROPERTY AND APPARATUS FOR ALLOCATING RESOURCE BY USING THE METHOD

(71) Applicant: Electronics and Telecommunications Research Institute, Daejeon (KR)

(72) Inventors: Ji Hyung Kim, Daejeon (KR); Ok-Sun Park, Daejeon (KR); Moon-Sik Lee, Daejeon (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 356 days.

(21) Appl. No.: 15/014,143

(22) Filed: Feb. 3, 2016

(65) Prior Publication Data

US 2016/0234818 A1 Aug. 11, 2016

(30) Foreign Application Priority Data

Feb. 5, 2015 (KR) ........................ 10-2015-0018238

(51) Int. Cl.
*H04W 72/04* (2009.01)
*H04W 4/70* (2018.01)
*H04W 12/06* (2009.01)
*H04W 28/06* (2009.01)
*H04W 48/16* (2009.01)

(52) U.S. Cl.
CPC ........... *H04W 72/042* (2013.01); *H04W 4/70* (2018.02); *H04W 12/06* (2013.01); *H04W 28/06* (2013.01); *H04W 48/16* (2013.01)

(58) Field of Classification Search
CPC ..... H04W 72/042; H04W 4/70; H04W 12/06; H04W 28/06; H04W 48/16
See application file for complete search history.

(56) References Cited

U.S. PATENT DOCUMENTS

| 2012/0064932 | A1 | 3/2012 | Lim et al. |
| 2013/0077594 | A1 | 3/2013 | Park et al. |
| 2013/0100899 | A1 | 4/2013 | Etri |
| 2013/0150109 | A1* | 6/2013 | Takano ................... H04L 5/001 455/509 |
| 2013/0157653 | A1* | 6/2013 | Huang .............. H04W 28/0215 455/423 |

(Continued)

FOREIGN PATENT DOCUMENTS

KR 101192415 B1 10/2012
KR 1020130006673 A 1/2013

(Continued)

*Primary Examiner* — Habte Mered
(74) *Attorney, Agent, or Firm* — William Park & Associates Ltd.

(57) ABSTRACT

Provided are a communication method based on device's property and an apparatus for allocating a resource by using the method. Devices are classified based on the device's property and a signal including information based on the resource allocation to the devices is transmitted to the devices. Data are received from a device through the allocated resource. Here, the devices transmitting pilot signals including device data values corresponding to preset expected reference data information transmit data through the allocated resource.

14 Claims, 3 Drawing Sheets

(56) References Cited

U.S. PATENT DOCUMENTS

| | | | | |
|---|---|---|---|---|
| 2013/0265953 A1* | 10/2013 | Salkintzis | ............. | H04W 8/186 370/329 |
| 2013/0336206 A1* | 12/2013 | Farhadi | ................ | H04W 4/005 370/328 |
| 2014/0079011 A1* | 3/2014 | Wiberg | ............... | H04W 74/006 370/329 |
| 2014/0112286 A1* | 4/2014 | Ahn | .................... | H04W 74/002 370/329 |
| 2015/0023281 A1* | 1/2015 | Wu | .................. | H04W 72/0473 370/329 |
| 2015/0237649 A1* | 8/2015 | Zhang | .................... | H04W 4/70 370/329 |
| 2015/0237651 A1* | 8/2015 | Nobusawa | .............. | H04W 4/70 370/329 |
| 2016/0295503 A1* | 10/2016 | Bucknell | ............. | H04W 74/006 |
| 2017/0006522 A1* | 1/2017 | Nishimura | ............ | H04W 8/186 |
| 2017/0150293 A1* | 5/2017 | Xu | ........................ | H04W 4/70 |
| 2017/0311355 A1* | 10/2017 | Yi | .......................... | H04W 4/70 |

FOREIGN PATENT DOCUMENTS

| | | |
|---|---|---|
| KR | 1020140017299 A | 2/2014 |
| WO | 2011120443 A1 | 10/2011 |

\* cited by examiner

COMMUNICATION METHOD BASED ON DEVICE'S PROPERTY AND APPARATUS FOR ALLOCATING RESOURCE BY USING THE METHOD

CROSS-REFERENCE TO RELATED APPLICATION

This application claims priority to and the benefit of Korean Patent Application No. 10-2015-0018238 filed in the Korean Intellectual Property Office on Feb. 5, 2015, the entire contents of which are incorporated herein by reference.

BACKGROUND OF THE INVENTION (a) Field of the Invention

The present invention relates to a communication method, and more particularly, to a communication method based on device's property and an apparatus for allocating a resource by using the method.

(b) Description of the Related Art

In recent years, as a wireless communication technology is developed with the development of a wireless communication system, various types of wireless communication systems, not typical communication between a user and a base station, have been emerged.

A machine type communication (MTC) is one type of data communication including at least one entity which does not require user interaction. The MTC is called a concept that a machine, not a terminal used by a human being, provides communication through a network. Compared to the MTC device, a device requiring the user interaction is called a human type communication (HTC) terminal.

The MTC is called machine to machine (M2M) communication. The device used in the MTC is called an MTC device. The MTC device includes a sensor or an actuator which has been variously used in a smart grid, an intelligent transportation system, or the like. An example of the MTC device may include a vending machine, an electricity meter, a water level measurement equipment of a dam, or the like.

In various types of wireless communication systems, when a plurality of devices such as the MTC device transmit a signal, a scheme of reducing a signaling overhead or efficiently performing a connection has been an important issue.

However, characteristics of data transmitted from each device are different, and therefore all the devices need not to apply the same authentication and transmission scheme. Therefore, transmission processing considering the characteristics of data is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a communication method based on device's property and an apparatus for allocating a resource by using the method.

An exemplary embodiment of the present invention provides a communication method with devices including: classifying the devices into groups based on device's property; performing resource allocation to a device group knowing an already expected data information content; transmitting a signal including resource allocation information based on the resource allocation to the devices; and receiving data from a device through the allocated resource.

The communication method may further include: performing authentication on a device group not knowing the already expected data information content based on authentication information transmitted from a device belonging to the corresponding device group and then performing the resource allocation.

The communication method may further include: transmitting a signal including the resource allocation information to the devices and then when a device data value included in a pilot signal received from the device is different from the preset expected reference data information, transmitting identification information on the corresponding pilot signal to request the authentication.

The communication method may further include: performing the authentication based on the authentication information transmitted from a device transmitting the corresponding pilot signal and performing the resource allocation, among the devices receiving the identification information on the pilot signal.

Another embodiment of the present invention provides a communication method with devices, including: transmitting a signal including resource allocation information to the devices; receiving pilot signals including device data values from the devices; comparing the device data values of the received pilot signals with preset expected reference data information; detecting pilot signals including device data values different from the expected reference data information; and transmitting identification information on the detected pilot signal to a device.

The communication method may further include: receiving authentication information transmitted from the device transmitting the corresponding pilot signal, among the devices receiving the identification information on the pilot signal; performing authentication on the corresponding device based on the authentication information; and performing resource allocation on the authenticated device.

The identification information on the pilot signal may include an index of the pilot signal.

The transmitting of the signal including the resource allocation information to the devices may include: performing resource allocation to a device group knowing an already expected data information content; and transmitting the signal including information on the resource allocation to the devices.

Yet another embodiment of the present invention provides an apparatus for allocating a resource under the communication environment that devices transmit data to a base station or transmit data to a device header operated as a central node, including: a radio frequency converter transmitting/receiving a signal through an antenna; and a processor connected to the radio frequency converter to control a transmission of the signal, in which the processor may include: a resource allocation processor transmitting a signal including resource allocation information to the devices; a pilot signal processor receiving pilot signals including device data values from the devices; a data information comparator comparing the device data values of the received pilot signals with preset expected reference data information to detect the pilot signals including device data values different from the expected reference data information; and an authentication processor transmitting identification information on the detected pilot signal to a device.

The authentication processor may receive authentication information transmitted from the device transmitting the corresponding pilot signal to perform authentication, among the devices receiving the identification information on the pilot signal and the resource allocation processor may perform resource allocation on the authenticated device. The identification information on the pilot signal may include an index of the pilot signal.

The apparatus may further include: a device classifier classifying the devices into groups based on device's property.

The device classifier may classify the devices into the groups based on a data information content transmitted from the devices.

The resource allocation processor may perform the resource allocation on a device group knowing an already expected data information content based on the classified result and transmit the signal including the resource allocation information to the devices.

DETAILED DESCRIPTION OF THE EMBODIMENTS

Figure 1:
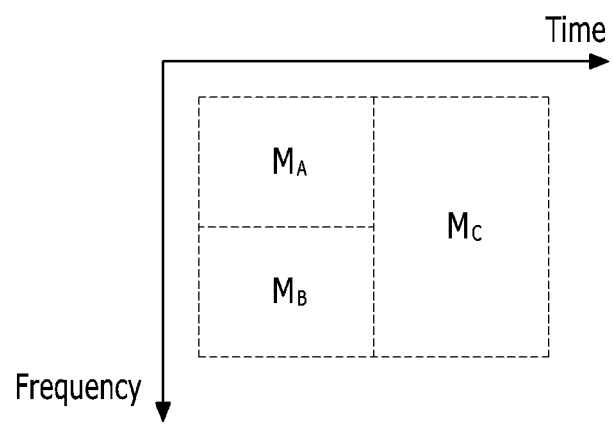
FIG. 1 is a diagram illustrating resource allocation based on device's property according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

Hereinafter, a method and an apparatus for transmitting information based on device's property according to an exemplary embodiment of the present invention will be described.

FIG. 1 is a diagram illustrating resource allocation based on device's property according to an exemplary embodiment of the present invention.

Elements dividing the device's property may have various schemes. For example, as illustrated in FIG. 1, under the environment that a plurality of devices $M_A$, $M_B$, and $M_C$ provide communication, data information contents to be transmitted by each device may be different. For example, a first device $M_A$ may have a data information content of several bits to be transmitted per device, a second device $M_B$ may have a data information content of tens of bits to be transmitted per device, and a third device $M_C$ may have a data information content of tens of bits or more to be transmitted per device. In this case, the device's property may be classified based on the data information content to be transmitted.

The devices may transmit data to a base station or transmit information to a device header operated as a central node under the machine to machine (M2M) communication environment. The base station or the device header transmits resource allocation information based on the device's property through a paging signal or a specific signal. Here, the resource allocation information is resource allocation per device group, not resource allocation per device. When there are a large number of devices, to manage a large number of devices, the devices may be classified into groups and management including resource allocation for each group may be performed. In this case, identifiers, that is, group identifiers may be allocated to each group. The same function or the same service may be provided to each group, the same wireless resource may be allocated to each group, and different wireless resources may be allocated to each group.

According to an exemplary embodiment of the present invention, the base station or the device header transmits the resource allocation information based on resource allocation based on a device group to devices through the paging signal or the specific signal. Here, it is considered that the base station or the device header knows expected reference data information on the $M_A$ or $M_B$ in advance. In this case, the $M_A$ or $M_B$ transmits a pilot signal in which data are implicit to the base station or the device header based on a contention, without going through a process for device ID authentication or network entry of a cellular. Even when a receiving terminal redundantly receives different pilot signals, the pilot signals are designed in a form in which they may be demodulated. For this purpose, a pilot signal design scheme is diverse. For example, the pilot signals which are orthogonal to each other or have a low correlation with each other may be designed based on a zadoff-chu (ZC) sequence.

The base station or the device header receives the pilot signals from the plurality of devices and compares the data implicit in the received pilot signals with the expected reference data information. When the detected data are different from the expected reference data information (range), the base station or the device header transmits an index of the pilot signal or the information on the pilot signal (e.g., the index of the pilot signal or the information on the pilot signal of the $M_A$) in which data different from the expected reference data information are implicit.

Among the devices receiving the index of the pilot signal or the information on the pilot signal transmitted from the base station or the device header, the device (for example, $M_A$) transmitting the corresponding pilot signal transmits the device authentication information to the base station or the device header. Here, the device authentication information may be a device's ID or position, etc. Next, the device (for example, $M_A$) transmitting other data different from the expected reference data information is authenticated based on the device authentication information transmitted from the base station or the device header. Similar to the existing cellular scheme, the $M_C$ goes through the authentication process such as the device ID and then is allocated with each resource per device or device group through the base station or the device header and transmits data through the corresponding resource.

In other words, among the devices receiving the index of the pilot signal or the information on the pilot signal transmitted from the base station or the device header, the device (for example, the $M_A$ or $M_B$ whose the expected reference data information the base station or the device header knows on) not transmitting the corresponding pilot signal transmits data to the base station or the device header through the corresponding resource without the separate authentication process.

By the above process, the device may be grouped based on the device's property and the appropriate authentication process, the resource allocation, and the transmission scheme per the device's property may be applied.

Figure 2:
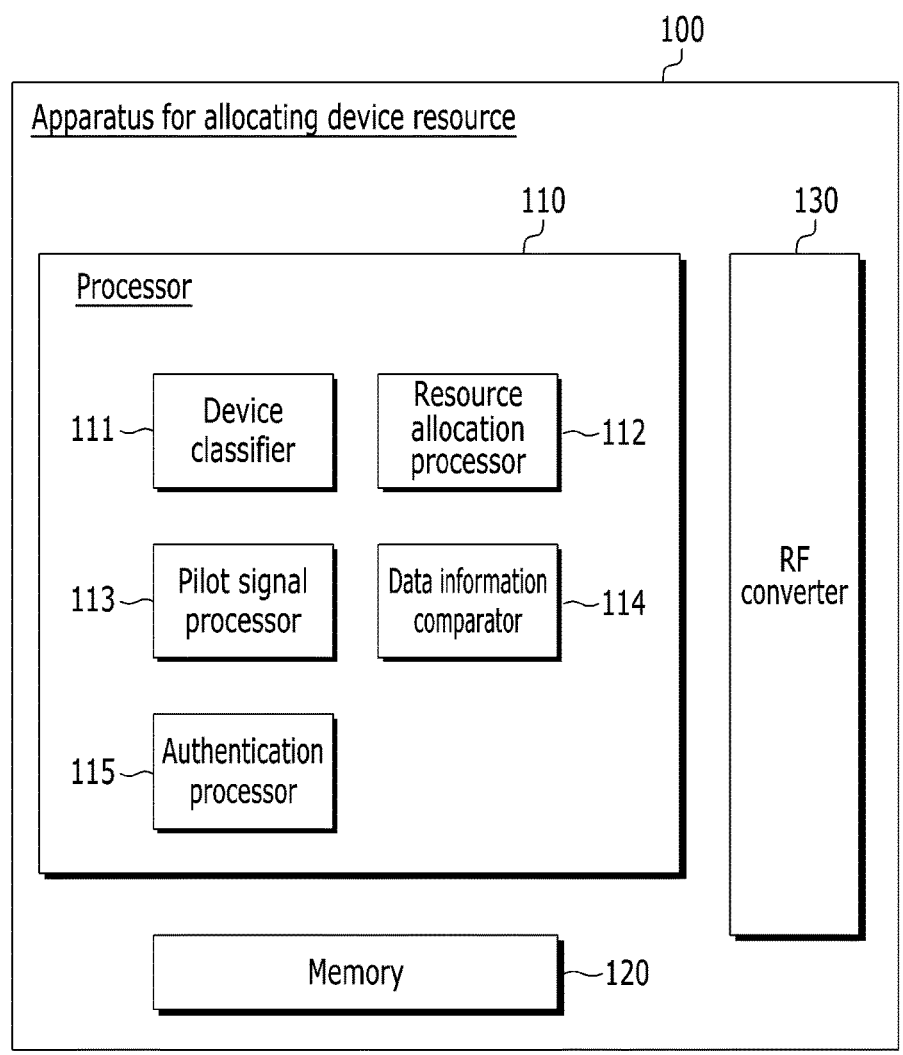
FIG. 2 is a diagram illustrating a structure of an apparatus for allocating a device resource according to an exemplary embodiment of the present invention.

FIG. 2 is a diagram illustrating a structure of an apparatus for allocating a device resource according to an exemplary embodiment of the present invention.

As illustrated in FIG. 2, an apparatus 100 for allocating a device resource may include a processor 110, a memory 120, and a radio frequency (RF) converter 130. The processor 110 may be configured to implement a procedure described based on FIG. 1 and a method to be described later.

For this purpose, the processor 110 may include a device classifier 111, a resource allocation processor 112, a pilot signal processor 113, a data information comparator 114, and an authentication processor 115.

The device classifier 111 classifies devices into groups based on the device's property. For example, the devices may be classified into the groups based on the data information content transmitted from the devices. However, the present invention is not limited thereto. The device classifier 111 may allocate an identifier for classifying the devices into each group.

The resource allocation processor 112 allocates resources to the devices and transmits resource allocation information to the devices. Here, the resource allocation processor 112 may allocate resources to each device group. For example, when the devices are classified into a first device group in which the data information content is a first information content (for example, within several bits), a second device group in which the data information content is a second information content (for example, within tens of bits), and a third device group in which the data information content is a third information content (for example, tens of bits or more), as illustrated in FIG. 1, resources may be allocated to each group. Each group may include at least one device. The present invention is not limited to the group classification, and the resource allocation processor 112 may allocate resources to each device.

Alternatively, the resource allocation processor 112 may classify devices into groups depending on whether to know the expected data information content in advance and the devices knowing the expected data information content in advance may be classified into the groups depending on the information content. Here, for better comprehension and ease of description, it is assumed that devices belonging to the first device group and the second device group know the expected data information content in advance and devices belonging to the third device group do not know the data information content. For better comprehension and ease of description, the expected data information content is named "expected reference data information".

The pilot signal processor 113 processes the pilot signals transmitted from each device and acquires the index of the pilot signal or the information on the pilot signal in which data are implicit. For better comprehension and ease of description, the index of the pilot signal or the information on the pilot signal in which data are implicit are named "identification information on the pilot signal". The pilot signal processor 113 acquires the data information content implicit in the pilot signal and transmits the acquired data information content to the data information comparator 114.

The data information comparator 114 compares the data information content implicit in the pilot signal with the already known expected reference data information. Further, according to the comparison result, the devices transmitting the pilot signal in which the data information content different from the expected reference data information is implicit are detected.

The authentication processor 115 transmits the identification information on the pilot signal transmitted from the detected devices, that is, the index of the pilot signal or the information on the pilot signal, according to the comparison result of the data information comparator 114. Further, after the transmission, the authentication is performed based on the device authentication information (device's identifier (for example, ID, etc.), device's position, etc.) received from the device.

Meanwhile, the authentication processor 115 performs the authentication processing using the device identifier, etc., on the devices which do not know the expected data information content in advance, similar to the existing cellular type. When the authentication process for the devices is performed, the resource allocation processor 112 allocates each resource per device or device group and transmits the information on the allocated resources to the devices. Next, the data of the device are transmitted through the resources allocated to the corresponding devices.

The memory 120 is connected to the processor 11 and stores various information associated with an operation of the processor 110. The RF converter 130 is connected to the processor 110 to transmit and receive a radio signal.

In the communication environment that the devices transmit data to the base station or transmit data to the device header operated as the central node, the apparatus 100 for allocating a resource may be implemented in a form in which it is included in the base station or the device header to communicate with devices.

The apparatus 100 for allocating a resource having the structure may communicate with the devices as follows.

Figure 3:
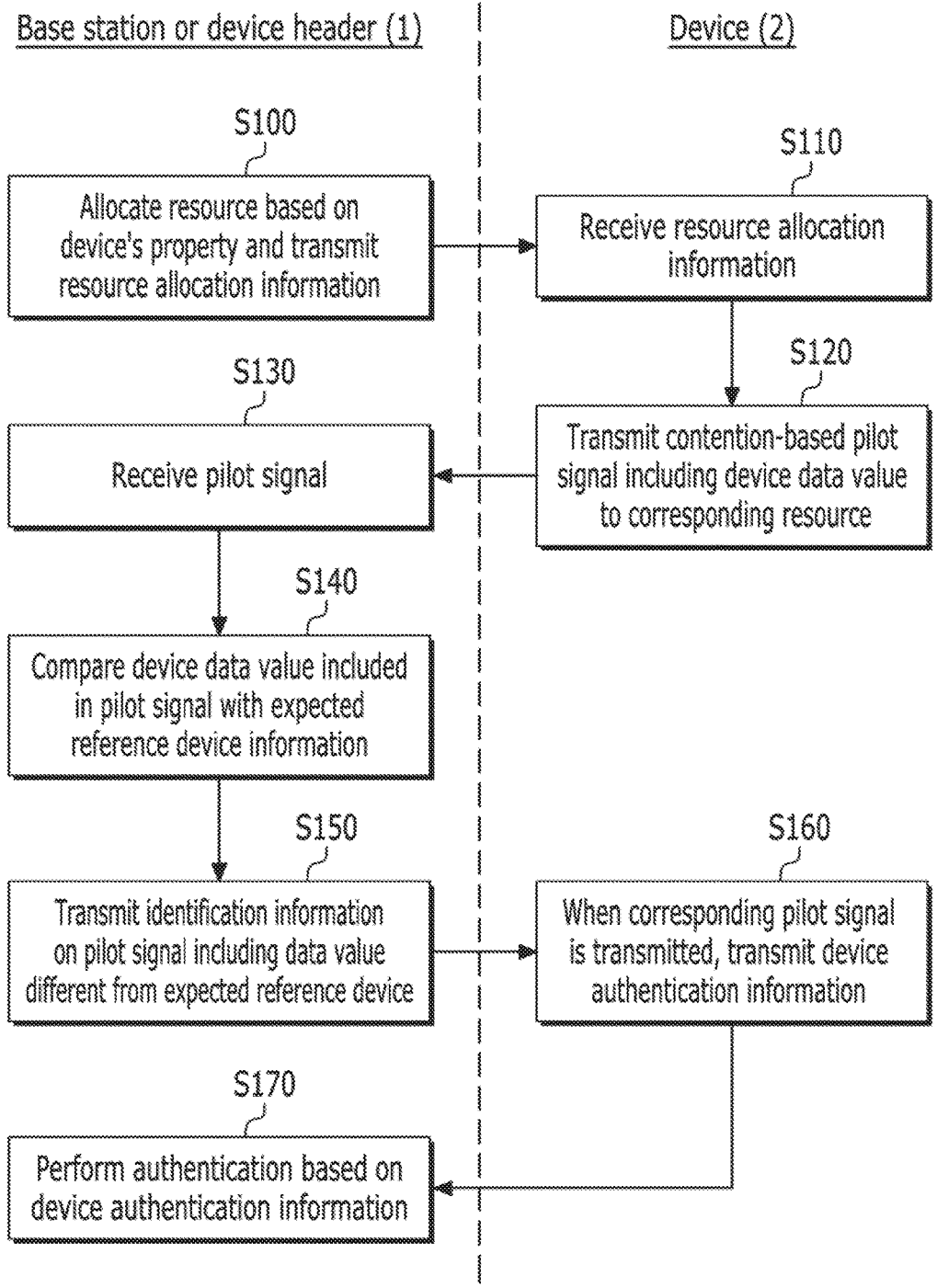
FIG. 3 is a flow chart of a communication method according to an exemplary embodiment of the present invention.

FIG. 3 is a flow chart of a communication method according to an exemplary embodiment of the present invention.

Under the communication environment that the devices transmit data to the base station or transmit data to the device header operated as the central node, the base station or the device header 1 allocates resources based on the device's property and transmits the resource allocation information through the paging signal or the specific signal (S100). For example, the resource may be allocated depending on the data information content transmitted from the device. For example, the devices may be classified into each group depending on whether to know the data information content and the expected data information content and the resource allocation to each device group may be different. The resource allocation information is transmitted to the devices through the paging signal or the specific signal.

Devices 2 receiving the resource allocation information through the paging signal and the specific signal transmit the pilot signal in which data are implicit to the base station or the device header (S110 and S120). The devices transmit the pilot signal in which data are implicit, that is, the pilot signal including device data values (measurement value, etc.) to the base station or the device header 1 based on the contention, without going through the process for device ID authentication or network entry of a cellular. The pilot signal does not include the device's identifier (ID, etc.) and therefore the base station or the device header 1 may not know what device transmits the pilot signal.

The base station or the device header 1 receives the pilot signal (S130) and compares the device data value included in the received pilot signal with the already known expected reference data information (S140). When the device data value included in the received pilot signal is different from the already known expected reference data information about the device group or the device to which the resource is allocated, the base station or the device header 1 transmits the identification information on the corresponding pilot signal (S150). That is, the index of the pilot signal or the information on the pilot signal in which data different from the expected reference data information are implicit is transmitted.

A device 2 receives the identification information (index, information on the pilot signal, or the like) on the pilot signal from the base station or the device header 1 and when the received pilot signal is a pilot signal transmitted from the device 2, transmits the device authentication information to the base station or the device header 1 (S160). Here, the device authentication information may be the device's ID or position, etc. Here, the device transmitting the device authentication information is a device which does not know the data information content already known by the base station or the device header and may be a device which is included in a third data group like $M_C$ illustrated in FIG.1.

The base station or the device header 1 performs the authentication on the device transmitting data different from the expected reference data information based on the device authentication information transmitted from the device 2 (S170). Next, after the authentication is completed, the corresponding device may be allocated with a resource and may transmit data to the base station or the device header 1 through the allocated resource.

Meanwhile, the devices (e.g., $M_A$ and $M_B$ illustrated in FIG. 1 as devices knowing the data information content already expected by the base station or the device header) in which the identification information (index, information on the pilot signal, or the like) on the pilot signal transmitted from the base station or the device header 1 is not the pilot signal transmitted by them may transmit data to the base station or the device header 1 through the corresponding resource without the separate authentication process.

By the above process, the device may be grouped based on the device's property and the appropriate resource allocation and the authentication per the device's property may be applied.

According to an exemplary embodiment of the present invention, it is possible to provide communication based on the device's property under the environment that the device communicates with the base station or the device header. In particular, it is possible to perform the resource allocation per device group based on the device's characteristics, the contention-based transmission scheme, the authentication procedure based on the device characteristics. As a result, the device group having the specific device's characteristics may reduce the signaling overhead and perform a few device authentications to obtain a performance gain.

The foregoing exemplary embodiments of the present invention are not implemented only by an apparatus and a method, and therefore, may be realized by programs realizing functions corresponding to the configuration of the exemplary embodiment of the present invention or recording media on which the programs are recorded While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication method with devices, comprising:
   classifying the devices into groups based on device's property;
   performing resource allocation to a first device group knowing an already expected data information content without authentication;
   performing authentication on a second device group not knowing the already expected data information content and then performing resource allocation to the second device group;
   transmitting a signal including resource allocation information based on the resource allocation to the devices; and
   receiving data from a device in the first device group and/or a device in the second device group through the allocated resource,
   wherein the expected data information content is an amount of bits to be transmitted by one of the respective devices.

2. The communication method of claim 1, wherein the performing authentication comprises performing authentication on the second device group not knowing the already expected data information content based on authentication information transmitted from a device belonging to the second device group.

3. The communication method of claim 2, further comprising: transmitting a signal including the resource allocation information to the devices and then when a device data value included in a pilot signal received from the device is different from the preset expected reference data information, transmitting identification information on the corresponding pilot signal to request the authentication.

4. The communication method of claim 3, further comprising: performing the authentication based on the authentication information transmitted from a device transmitting the corresponding pilot signal and performing the resource allocation, among the devices receiving the identification information on the pilot signal.

5. A communication method with devices in device groups, comprising:
   transmitting a signal including resource allocation information to the devices;
   receiving pilot signals including device data values from the devices;
   comparing the device data values of the received pilot signals with preset expected reference data information;
   detecting pilot signals including device data values different from the expected reference data information;
   transmitting identification information on the detected pilot signals to a device in a device group, and
   performing authentication on the device corresponding to the detected pilot signals and then performing resource allocation to the device corresponding to the detected pilot signals,
   wherein the expected reference data information is an amount of bits to be transmitted by the device in the device group.

6. The communication method of claim 5, wherein the performing authentication comprises:

receiving authentication information transmitted from the device transmitting the corresponding pilot signal, among the devices receiving the identification information on the pilot signal;

performing authentication on the corresponding device based on the authentication information; and performing resource allocation on the authenticated device.

7. The communication method of claim 5, wherein: the identification information on the pilot signal includes an index of the pilot signal.

8. The communication method of claim 5, wherein: the transmitting of the signal including the resource allocation information to the devices includes:

performing resource allocation to a device group knowing an already expected data information content; and transmitting the signal including information on the resource allocation to the devices.

9. An apparatus for allocating a resource under the communication environment that devices in device groups transmit data to a base station or transmit data to a device header operated as a central node, comprising:

a radio frequency converter transmitting/receiving a signal through an antenna; and a processor connected to the radio frequency converter to control a transmission of the signal, wherein the processor includes:

a resource allocation processor transmitting a signal including resource allocation information to the devices;

a pilot signal processor receiving pilot signals including device data values from the devices;

a data information comparator comparing the device data values of the received pilot signals with preset expected reference data information to detect the pilot signals including device data values different from the expected reference data information; and an authentication processor transmitting identification information on the detected pilot signals to a device in a device group, and wherein the expected reference data information is an amount of bits to be transmitted by the device in the device group, and authentication is performed on the device corresponding to the detected pilot signals and then resource allocation is performed on the device corresponding to the detected pilot signals.

10. The apparatus of claim 9, wherein: the authentication processor receives authentication information transmitted from the device transmitting the corresponding pilot signal to perform authentication, among the devices receiving the identification information on the pilot signal, and the resource allocation processor performs resource allocation on the authenticated device.

11. The apparatus of claim 10, wherein: the identification information on the pilot signal includes an index of the pilot signal.

12. The apparatus of claim 10, wherein the processor further comprises a device classifier processor classifying the devices into groups based on device's property.

13. The apparatus of claim 12, wherein: the device classifier processor classifies the devices into the groups based on a data information content transmitted from the devices.

14. The apparatus of claim 13, wherein: the resource allocation processor performs the resource allocation on a device group knowing an already expected data information content based on the classified result and transmits the signal including the resource allocation information to the devices.

* * * * *